United States Patent
Bae

(10) Patent No.: US 9,216,352 B2
(45) Date of Patent: Dec. 22, 2015

(54) APPARATUS AND METHOD FOR GENERATING SENSORY VIBRATION

(75) Inventor: Sungho Bae, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 649 days.

(21) Appl. No.: 13/483,951

(22) Filed: May 30, 2012

(65) Prior Publication Data

US 2013/0038603 A1 Feb. 14, 2013

(30) Foreign Application Priority Data

Aug. 9, 2011 (KR) .................. 10-2011-0079279

(51) Int. Cl.
*A63F 13/40* (2014.01)
*G06F 3/01* (2006.01)

(52) U.S. Cl.
CPC ............. *A63F 13/10* (2013.01); *G06F 3/016* (2013.01); *A63F 2300/1037* (2013.01); *A63F 2300/204* (2013.01); *A63F 2300/302* (2013.01); *A63F 2300/64* (2013.01); *A63F 2300/8076* (2013.01); *G06F 2203/013* (2013.01)

(58) Field of Classification Search
CPC .............. A63F 2300/302; A63F 2300/8076
See application file for complete search history.

(56) References Cited

U.S. PATENT DOCUMENTS

| | | | |
|---|---|---|---|
| 6,174,587 B1 * | 1/2001 | Figge, Sr. .................. | 428/178 |
| 2001/0029319 A1 * | 10/2001 | Kazlausky et al. ......... | 600/300 |
| 2006/0125771 A1 * | 6/2006 | Inuzuka et al. ............. | 345/102 |
| 2006/0140468 A1 * | 6/2006 | Holl ............................ | 382/135 |
| 2008/0204266 A1 * | 8/2008 | Malmberg et al. .......... | 340/683 |
| 2009/0085878 A1 | 4/2009 | Heubel et al. | |
| 2009/0315898 A1 * | 12/2009 | Cailliere et al. ............ | 345/473 |
| 2011/0043477 A1 * | 2/2011 | Park et al. ................... | 345/174 |
| 2011/0102464 A1 * | 5/2011 | Godavari ..................... | 345/650 |

FOREIGN PATENT DOCUMENTS

| | | |
|---|---|---|
| JP | 9-84957 A | 3/1997 |
| JP | 2010-541071 A | 12/2010 |
| KR | 10-2010-0003523 A | 1/2010 |

OTHER PUBLICATIONS

"Realistic Camera/Screen Shake from Explosion" http://gamedev.stackexchange.com/questions/1828/realistic-camera-screenshake-from-explosion. Archived on Apr. 28, 2011. Retrieved on Nov. 13, 2014 from <https://web.archive.org/web/20110428170828/http://gamedev.stackexchange.com/questions/1828/realistic-camera-screen-shake-from-explosion>.*

* cited by examiner

*Primary Examiner* — Zhengxi Liu
(74) *Attorney, Agent, or Firm* — Birch, Stewart, Kolasch & Birch, LLP

(57) ABSTRACT

In an image display apparatus for outputting a vibration with a sense of realism and an realistic sense and a method for adjusting an intensity of vibration for implementing a vibration with sense of realism and an realistic sense, a user of the image display apparatus can directly recognize (experience) a situation happened on a space formed by a screen by virtue of the vibration with the sense or presence and the realistic sense, output in association with an effect of a displayed image, and also can feel more the sense of realism and the realistic sense from the situation in the game or a virtual reality.

13 Claims, 15 Drawing Sheets

FIG. 8
(a) 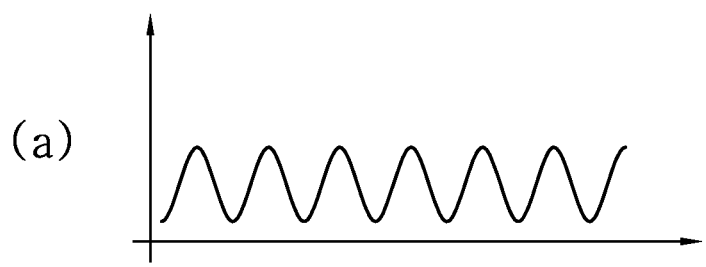
(b) 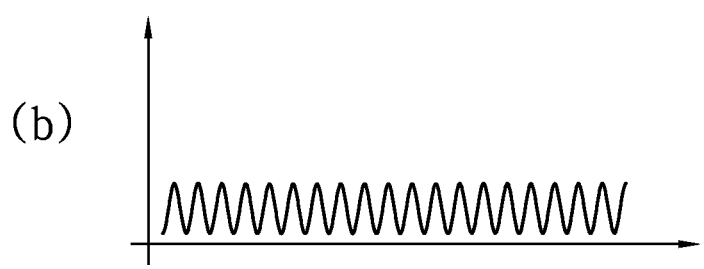
(c) 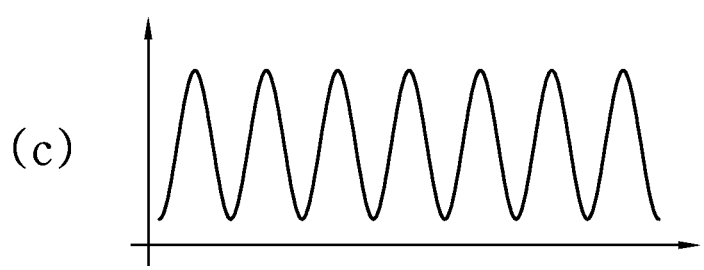

FIG. 9
(a) 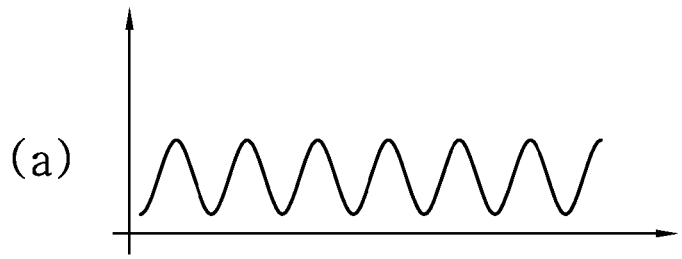
(b) 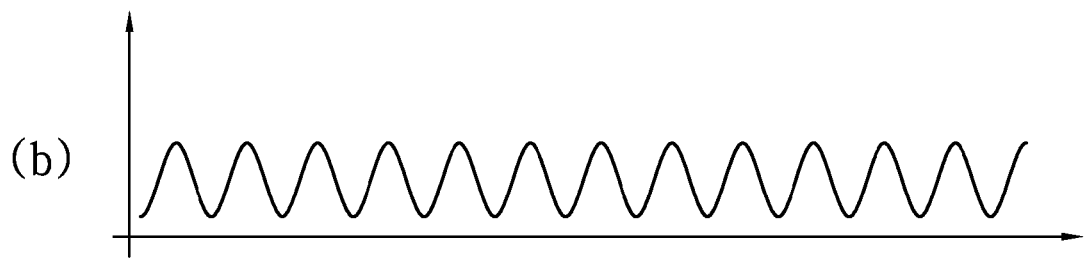
(c) 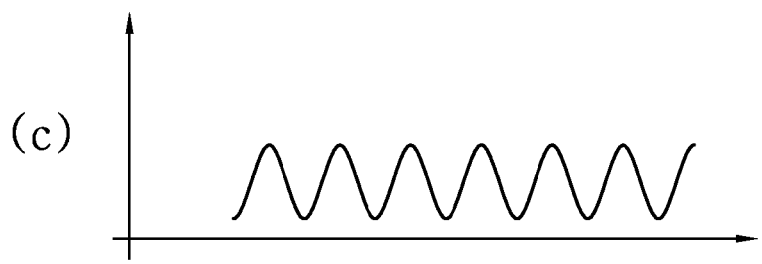
(d) 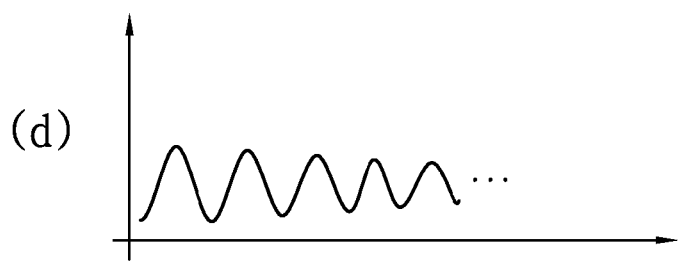

FIG. 14
(a) 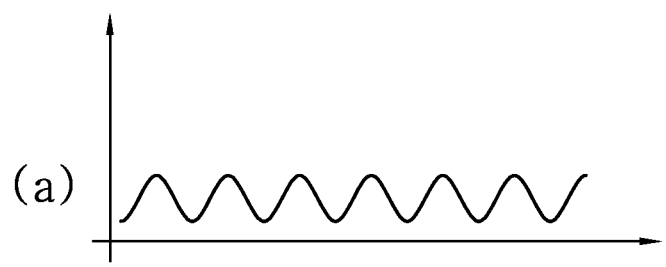
(b) 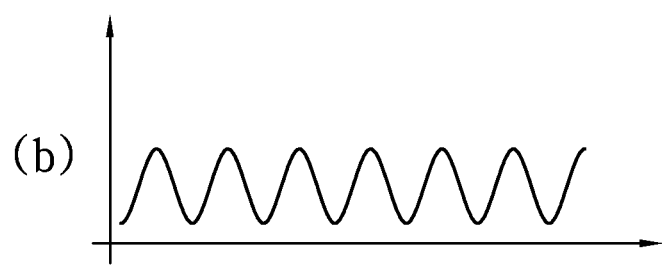
(c) 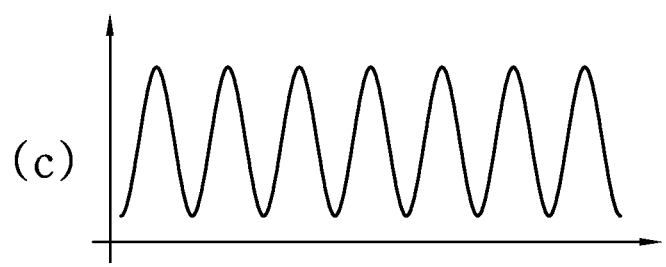

APPARATUS AND METHOD FOR GENERATING SENSORY VIBRATION

CROSS-REFERENCE TO RELATED APPLICATION

Pursuant to 35 U.S.C §119, this application claims the benefit of earlier filing date and right of priority to Korean Application No. 10-2011-0079279, filed in Republic of Korea on Aug. 9, 2011, the contents of which is incorporated by reference herein in its entirety.

BACKGROUND OF THE INVENTION

1. Field of the Invention

This specification relates to an apparatus for generating a vibration with a sense of realism (realistic vibration effect, sensory vibration effect) and a method for adjusting a vibration output parameter for implementing a vibration with a sense of realism, and particularly, to a method for implementing a vibration with a sense of realism, in which a vibration output parameter is adjusted based on an environment or condition of a screen displayed.

2. Background of the Invention

Recently, the growth of an image display apparatus (i.e., display) for displaying images (e.g., two-dimensional (2D) image, three-dimensional (3D) image, etc.) has allowed a user of the image display apparatus to directly recognize (experience) a situation happened in a multimedia-associated application (especially, a game, a virtual reality experiencing program, and the like) when the user uses the corresponding application. The user has felt more a sense of realism or an realistic sense from the situation within the game or a virtual reality.

Although the growth of the image display method has improved the sense of realism of the multimedia-associated application with respect to a space, feelings which can be felt in the space may not be limited to the visual feeling, so the user may still feel like an observer other than a hero or heroin within the application.

To solve such problem, when a specific event is generated while the application is executed, the image display apparatus may output a vibration to the outside of the image display apparatus via a vibrator mounted within the apparatus.

FIG. 1 is an exemplary view showing an example of outputting a vibration involved in an execution of a multimedia-associated application in the related art image displaying apparatus.

FIG. 1 shows a firing emulation game as the multimedia-associated application and an explosion of a bomb thrown (for example, grenade) as an event generating during the game.

Referring to FIG. 1, the explosion of the bomb, which is the event generated while playing the firing emulation game, may be generated at various positions on a screen displayed. For example, a first vibration output v110 may be output to the outside of the image display apparatus in response to a first event, which is generated due to the bomb being thrown onto a first point (position) 220. Also, a second vibration output v120 may be output to the outside of the image display apparatus in response to a second event, which is generated due to the bomb being thrown onto a second point 230.

Here, a user of the firing emulation game may enjoy the sense of realism or the realistic sense by virtue of the effect of the first vibration output v110 or the second vibration output v120 in addition to the effect of an image displayed.

However, the above method generates a vibration output without concerning about the environments of the space formed by the screen displayed, so it may be different from a real situation. Especially, considering that the latest trend of 3D games is to realize a virtual reality more similar to the real environment, the related art method may fail to further increase the sense of realism or the realistic sense of the 3D games.

SUMMARY OF THE INVENTION

Therefore, an aspect of the detailed description is to provide an image display apparatus capable of making a game or a virtual reality seem to be more realistic or vivid, and a method for adjusting a vibration output parameter for implementing a vibration with a sense of realism.

To achieve these and other advantages and in accordance with the purpose of this specification, as embodied and broadly described herein, an image display apparatus may include, a controller to provide a vibration output parameter for a vibration corresponding to a graphical position of at least one event displayed on a graphical screen when a vibration should be output due to generation of the event displayed on the graphical screen and an exciter to generate the vibration according to the provided output parameter.

In accordance with one exemplary embodiment, the vibration output parameter may be at least one of an intensity of vibration, a time duration of vibration, a start time of vibration and an attenuation ratio of vibration according to a time.

In accordance with another exemplary embodiment, the intensity of vibration may be decided by a frequency of vibration or an amplitude of vibration.

In accordance with another exemplary embodiment, the graphical position indicates at least one of 2-dimensional coordinates on 2-dimensional graphical screen and 3-dimensional coordinates including graphical depth on 3-dimensional graphical screen.

In accordance with another exemplary embodiment, the screen may be divided into a plurality of regions, and the controller may decide the vibration output parameter for the event based on a region to which the event belongs, among the plurality of regions.

In accordance with another exemplary embodiment, the controller may decide the vibration output parameter for the event based on a first distance which is a distance between a position of the event and a first object present on the screen.

In accordance with another exemplary embodiment, the controller may decide the vibration output parameter for the event based on a ratio of the first distance and a second distance.

In accordance with another exemplary embodiment, the second distance may be a maximum distance between two random points on the screen or a distance to the farthest point from the first object on the screen.

In accordance with another exemplary embodiment, the vibration output parameter may be the intensity of vibration and the time duration of vibration, and the time duration of vibration may be proportional to the intensity of vibration.

In accordance with another exemplary embodiment, the vibration output parameter may be the intensity of vibration and the start time of vibration, and the start time of the vibration may be inversely proportional to the intensity of vibration.

In accordance with another exemplary embodiment, the exciter may include at least one vibration generator, and the screen may be divided into a plurality of regions, wherein the controller may control the at least one vibration generator corresponding to the region to which a position of the event belongs, among the plurality of regions, to generate vibration.

In accordance with another exemplary embodiment, the apparatus may further include a display unit to output a graphical screen, and the controller may control the display unit to output a graphical screen based on the generated vibration.

In accordance with another exemplary embodiment, the displayed graphical screen based on the generated vibration appear to a user of the apparatus that a view of the graphical screen is shaking or vibrating.

In accordance with another exemplary embodiment, the controller may decide the vibration output parameter for the event based on the position of the event and a characteristic of a graphic object prevent on the screen.

In accordance with another exemplary embodiment, the characteristic of the graphic object may be at least one of size, shape, specific gravity and impact absorption ratio of the graphic object.

In accordance with another exemplary embodiment, the vibration output parameter may be the intensity of vibration, and when the vibrations should be output due to generation of a plurality of events on the screen, the controller may calculate the intensity of the vibration by the sum of intensities of vibrations corresponding to the plurality of events.

In accordance with another exemplary embodiment, the controller may decide the vibration output parameter for the event based on the position of the event and a movement speed of a first object present on the screen.

To achieve these and other advantages and in accordance with the purpose of this specification, as embodied and broadly described herein, a method for adjusting an intensity of a vibration may include checking whether a vibration should be output due to generation of at least one event when the event is generated on a displayed screen, deciding a vibration output parameter for a vibration corresponding to the event based on a position of the event generated on the screen when it is checked that the vibration should be output, and outputting the vibration according to the decided vibration output parameter.

In accordance with one exemplary embodiment, the vibration output parameter may be at least one of an intensity of vibration, a time duration of vibration, a start time of vibration and an attenuation ratio of vibration according to a time.

In accordance with one exemplary embodiment of the present disclosure, an image display apparatus for outputting a vibration with an adjusted intensity is provided.

In accordance with an image display apparatus for outputting a vibration with a sense of realism and an realistic sense and a method for adjusting an intensity of vibration for implementing a vibration with sense of realism and an realistic sense, a user of the image display apparatus can directly recognize (experience) a situation happened on a space formed by a screen by virtue of the vibration with the sense or presence and the realistic sense, output in association with an effect of a displayed image, and also can feel more the sense of realism and the realistic sense from the situation in the game or a virtual reality.

To achieve these and other advantages and in accordance with the purpose of this specification, as embodied and broadly described herein, an apparatus may include, A body; A displayed unit at the body to provide a graphical screen output; A vibration output unit connected with the body to provide different types of physical vibration outputs applied to the body; and A controller, configured to cooperate with the display unit and the vibration output unit, to control to vibration output unit such that the different types of physical vibration outputs are generated based on a variable graphical event being shown via the graphical screen output, Wherein the different types of physical vibration outputs are determined by at least one parameter that is extracted from a displayed graphical location of the graphical event being shown via the graphical screen output.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 8 is an exemplary view showing a method for adjusting the intensity of vibration in accordance with the third exemplary embodiment;

FIG. 9 is an exemplary view showing various output forms of a vibration which may be generated in an image display apparatus in accordance with a fourth exemplary embodiment;

FIG. 14 is an exemplary view showing a method for implementing a vibration with a sense of realism using a superposition principle in accordance with an eighth exemplary embodiment;

DETAILED DESCRIPTION OF THE INVENTION

Figure 1:
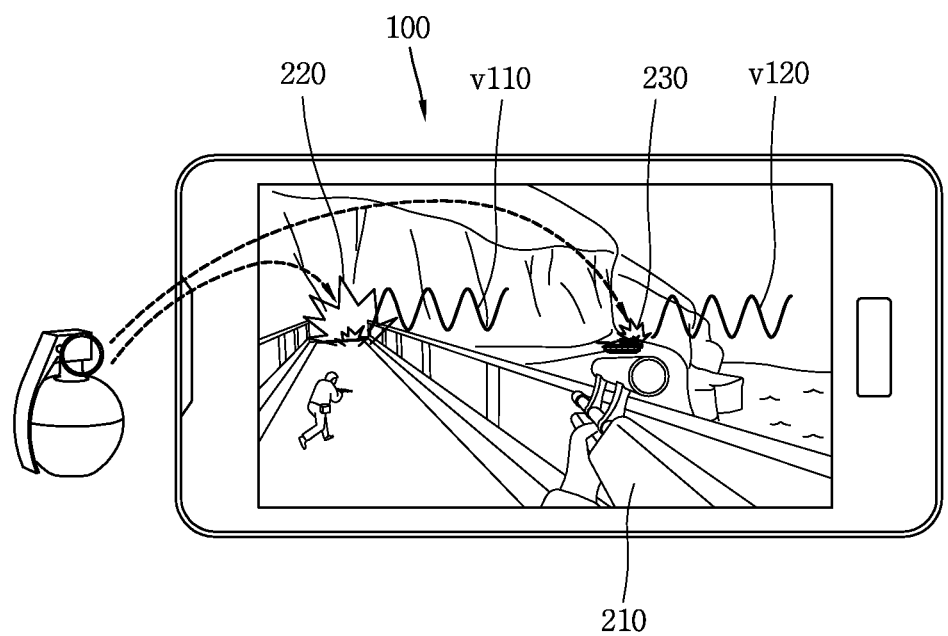
FIG. 1 is an exemplary view showing an embodiment of a vibration output involved in an execution of a multimedia-associated application in the related art image display apparatus.

The technique disclosed in this specification may be applied to an image display apparatus. However, the technique may not be limited to it but applicable to any image display system to which the technical scope of the technique can be applied and a control method thereof, a portable device capable of displaying an image and a control method thereof, and an apparatus capable of executing a multimedia-related application and a control method thereof. Especially, the portable device indicates a small terminal produced to be manipulated for inputting information or the like while carrying it with a hand. Examples of the portable device may include a mobile communication terminal such as a cellular phone, a Personal Digital Assistant (PDA), a Digital Multimedia Broadcasting (DMB) terminal, a MPEG layer 3 (MP3) player, a Portable Multimedia Player (PMP), a portable game player such as a Playstation Portable (PSP), and the like.

An image display apparatus in accordance with one exemplary embodiment of this specification may generate a vibration output in consideration of environments formed by a screen of the image display apparatus so as to address unreality and non-existence of a sense of realism of the related art image display apparatus.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

Hereinafter, a mobile terminal associated with the present disclosure will be described in more detail with reference to the accompanying drawings. A suffix "module" or "unit" used for constituent elements disclosed in the following description is merely intended for easy description of the specification, and the suffix itself does not give any special meaning or function. Also, those suffixes may be implemented by hardware, software or a combination thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Embodiments of the present specification will be described below in detail with reference to the accompanying drawings, where those components are rendered the same reference number that are the same or are in correspondence, regardless of the figure number, and redundant explanations are omitted.

In describing the present specification, if a detailed explanation for a related known function or construction is considered to unnecessarily divert the gist of the present specification, such explanation has been omitted but would be understood by those skilled in the art. The accompanying drawings are used to help easily understood the technical idea of the present specification and it should be understood that the idea of the present specification is not limited by the accompanying drawings. The idea of the present specification should be construed to extend to any alterations, equivalents and substitutes besides the accompanying drawings.

Hereinafter, description will be given of an image display apparatus in accordance with exemplary embodiments disclosed in this specification with reference to FIG. 2.

Description of Image Display Apparatus According to Exemplary Embodiments

In accordance with exemplary embodiments of this specification, apparatus includes a body, a displayed unit at the body to provide a graphical screen output, a vibration output unit connected with the body to provide different types of physical vibration outputs applied to the body and a controller, configured to cooperate with the display unit and the vibration output unit, to control to vibration output unit such that the different types of physical vibration outputs are generated based on a variable graphical event being shown via the graphical screen output, Wherein the different types of physical vibration outputs are determined by at least one parameter that is extracted from a displayed graphical location of the graphical event being shown via the graphical screen output.

Also, the graphical position indicates at least one of 2-dimensional coordinates on 2-dimensional graphical screen and 3-dimensional coordinates including graphical depth on 3-dimensional graphical screen.

Figure 2:
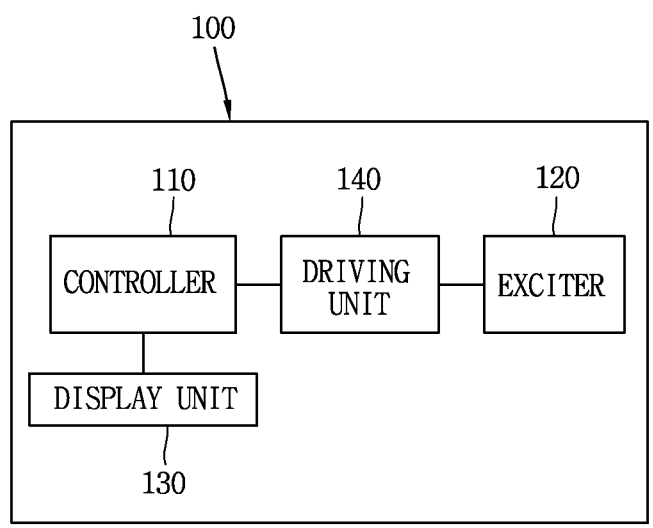
FIG. 2 is a block diagram showing a configuration of an image display apparatus for implementing a vibration with a sense of realism (i.e., realistic vibration, sensory vibration) in accordance with exemplary embodiments of the present disclosure.

FIG. 2 is a block diagram showing a configuration of an image display apparatus for implementing a vibration with a sense of realism (realistic vibration effect, sensory vibration effect) in accordance with exemplary embodiment of this specification.

As shown in FIG. 2, an image display apparatus 100 may include a controller 100 and a exciter (vibration output unit) 120. The image display apparatus 100 may further include a display unit 130 and a driving unit 140. Besides, the image display apparatus 100 may further include various components for performing a realistic (sensory) vibration function in addition to image displaying.

Hereinafter, those components will be described in sequence.

The controller 110 may receive and process multimedia data such that the image display apparatus 100 can output information related to an image (for example, 2D image, 3D image, etc.), voice, vibration or other multimedia, and control various components of the image display apparatus 100.

Also, for output of vibrations with a sense of realism or realistic sense in accordance with the exemplary embodiments of this specification, the controller 110 may perform various functions for allowing the realistic vibration function to be executed as well as image displaying. The realistic vibration function may denote a function of generating a vibration in consideration of environments of a space formed by a screen displayed.

The environments of the space formed by the screen may indicate virtual environments which may affect a vibration that will be generated (output) from the image display apparatus 100. For example, the environments of the space may include a distance between a point of a user object substituted on the space and a point of an event generated on the space, a material existing on the space, speed of the user object moving, the number of events generated when a plurality of events are generated, and the like.

The controller 110 may detect (sense) whether at least one event is generated on a screen of the image display apparatus 100. The at least one event may indicate various accidents (situations, conditions) which may occur on the screen. For example, the event may include an explosion due to a grenade being thrown and shocks by firing which may be generated in a 3D firing emulation game, an impact due to collision between flights which may occur in a shooting game, a shaking of a building and shocks of earthquake which may happen while executing an application associated with a virtual reality, and the like.

When the at least one event has been generated, the controller 110 may check whether a vibration should be generated (output) in response to the generated event. For example, when an event that a bird flies is generated on the screen, the controller 110 may determine the event that the bird flies as an event for which a vibration does not have to be output. When an event that a grenade is thrown is generated on the screen, the controller 100 may determine that a vibration has to be output in response to the throwing of the grenade, so as to control the vibration exciter 120 to generate the vibration.

When the at least one event is generated, the controller 110 may decide a vibration output parameter in correspondence with a position of the event. The output parameter may be at least one of an intensity of vibration, a time duration of vibration, a start time of vibration and an attenuation ratio of vibration according to a time. For example, when a first event is generated at a first point and a second event is generated at a second point on the screen, the first point may be closer to the user object than the second point on the screen. In this case, when the vibration output parameter is the intensity of vibration, the controller 110 may set the intensity of the vibration output in association with the first point to be higher than that in association with the second point.

In accordance with the one exemplary embodiment, the intensity of vibration of the vibration output parameters may be set according to frequency amplitude or some other vibration characteristics. In general, a method for making a user of the image display apparatus 100 feel stronger vibration may include increasing the frequency of vibration output, or increasing the amplitude of vibration output. However, it will be obvious to a person skilled in the art that various methods as well as those methods can be applied to increase the intensity of vibration.

The exciter 120 may generate a vibration according to the decided vibration output parameter. Here, the controller 110 may generate a control signal which allows for outputting a vibration to the outside of the image display apparatus 100 according to the vibration output parameter decided. Hence, the exciter 120 may generate a vibration according to the output parameter based on the control signal.

In accordance with the one exemplary embodiment of this specification, the image display apparatus 100 may further include the driving unit 140. Therefore, the controller 110 may send the generated control signal to the driving unit 140, to control the driving unit 140 to drive the exciter 120. The driving unit 140 will be explained later.

The exciter 120 may include a vibration generator or vibrator (not shown) to generate a vibration. Also, the vibration exciter 120 may further include a vibration controller (not shown) to control a specific type of vibration to be generated in response to a driving signal of the driving unit 140. In addition, the exciter 120 may further include elements for controlling vibrations generated from the vibration generator more stably and efficiently.

As the vibration generator, a vibration motor may generally be employed. The vibration motor may generate a vibration by converting electric energy into mechanical energy and rotating an unbalanced weight by the converted mechanical energy.

The display unit 130 may act to output a screen under control of the controller 110. The screen may be a screen associated with a multimedia-associated application. For example, the screen may be associated with 3D games or virtual reality experience programs.

The driving unit 140 may drive the exciter 120 such that the vibration can be output to the outside of the image display apparatus 100. The driving unit 140 may receive the control signal generated from the controller 110, and generate a driving signal for driving the exciter 120 based on the received control signal.

The driving unit 140 may be implemented in various forms. For example, the driving unit 140 may be implemented as a current drive circuit so as to drive the exciter 120 in a current mode, or implemented as a voltage adjusting circuit to transfer a voltage level corresponding to a calculated intensity of vibration to the exciter 120 so as to output a vibration corresponding to the voltage level.

Hereinafter, description will be given of a method for implementing a vibration with a sense of realism (realistic vibration effect, sensory vibration effect) in accordance with the exemplary embodiments of this specification, with reference to FIG. 3.

Figure 3:
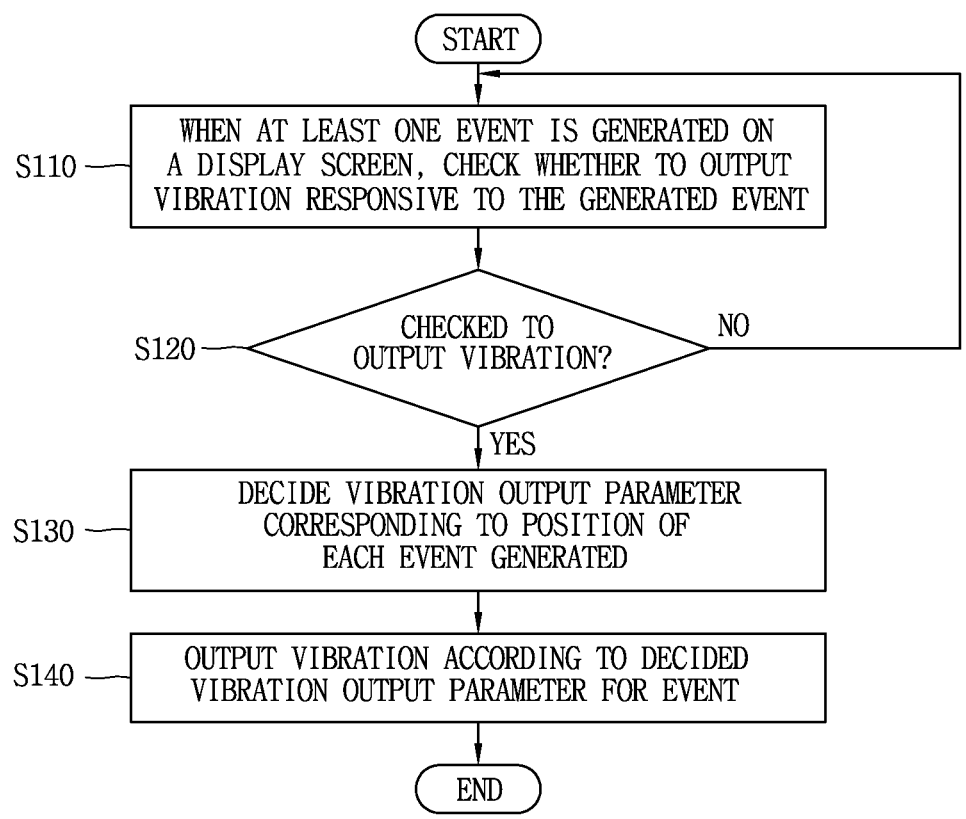
FIG. 3 is a flowchart showing a method for implementing a vibration with a sense of realism in accordance with the exemplary embodiments.

Description of Method for Implementing Vibration with Sense of Realism According to Exemplary Embodiment FIG. 3 is a flowchart showing a method for implementing a vibration with a sense of realism in accordance with exemplary embodiments.

As shown in FIG. 3, a method for implementing a vibration with a sense of realism in accordance with the exemplary embodiments of this specification may include the following steps.

First, when at least one event is generated on a screen displayed, the image display apparatus 100 may check whether or not to generate a vibration in response to the generated event (S110).

When it is checked to generate the vibration (S120), the image display apparatus 100 may decide a vibration output parameter corresponding to a position of the event generated on the screen (S130).

Next, the image display apparatus 100 may generate a vibration according to the decided vibration output parameter with respect to the event (S140).

As aforementioned, the output parameter may be at least one of an intensity of vibration, a time duration of vibration, a start time of vibration, an attenuation ratio of vibration according to a time and the like. Also, the at least one event indicates various accidents or situations which may occur on the screen. The image display apparatus 100 may send various types of outputs to the outside such that a user of the image display apparatus 100 can recognize the at least one event. For example, upon an explosion due to a grenade being thrown, the image display apparatus 100 may output a vibration to make the user recognize the explosion.

Hereinafter, description will be given of a method for deciding a vibration output parameter in the image display apparatus 100, with reference to FIGS. 4 and 5.

Description of Method for Deciding Vibration Output Parameter

The controller 110 of the image display apparatus 100 may decide a vibration output parameter based upon a position of each event in various manners.

In accordance with one exemplary embodiment, the controller 110 may decide a vibration output parameter based on 2D or 3D coordinates that each event may have on the screen. For example, the controller 110 may decide the vibration output parameter based on a table which stores output parameters corresponding to the coordinates on the screen. That is, when a specific event has been generated on (2,2) as the 2D coordinates on the screen, the controller 110 may decide an output parameter corresponding to the coordinates (2,2) with reference to the previously stored table. To this end, the image display apparatus 100 may further include a memory (not shown).

In accordance with one exemplary embodiment, the controller 110 may decide a vibration output parameter based on a specific region, to which the position of each event belongs, on the screen which is divided into a plurality of regions. This output parameter will be explained later with reference to FIG. 4.

In accordance with one exemplary embodiment, the controller 110 may decide a vibration output parameter for each event based on a first distance, which is a distance between a position of each event and a first object 210 existing on the screen. The controller 110 may use an absolute value or relative value of the first distance, when deciding the vibration output parameter for each event based on the first distance. For example, the absolute value of the first distance may indicate a geometrical distance between the position of each event and the first object existing on the screen. Also, the relative value of the first distance may be a value obtained by normalizing the geometrical distance of the first distance based on a specific value (or reference distance). Also, when a plurality of events are generated, the relative value of the first distance may be conveniently used when comparing distances generated (defined) by the plurality of events.

Also, the controller 110 may refer to a table in which distance-based vibration output parameters are stored, in deciding a vibration output parameter for each event based on the first distance. For example, when the first distance is 10 m, the controller 110 may decide a vibration output parameter corresponding to 10 m with reference to the table. To this end, the image display apparatus 100 may further include a memory (not shown).

In accordance with one exemplary embodiment, the controller 110 may decide a vibration output parameter for each event based on a ratio of the first distance and a second distance. As aforementioned, the second distance may be a reference distance for normalizing the first distance. For example, the second distance may correspond to a maximum distance expected between two random points on the screen, or a distance to the farthest point from the first object on the screen. A method using the normalization of the first distance, in deciding an intensity of vibration among the output parameters, will be described later with reference to FIGS. 5 and 6.

Besides, it will be understood by a person skilled in the art that various methods for deciding the vibration output parameter can be applied to the image display apparatus 100 for implementing the vibration with the sense of realism according to this specification.

First Exemplary Embodiment

Figure 4:
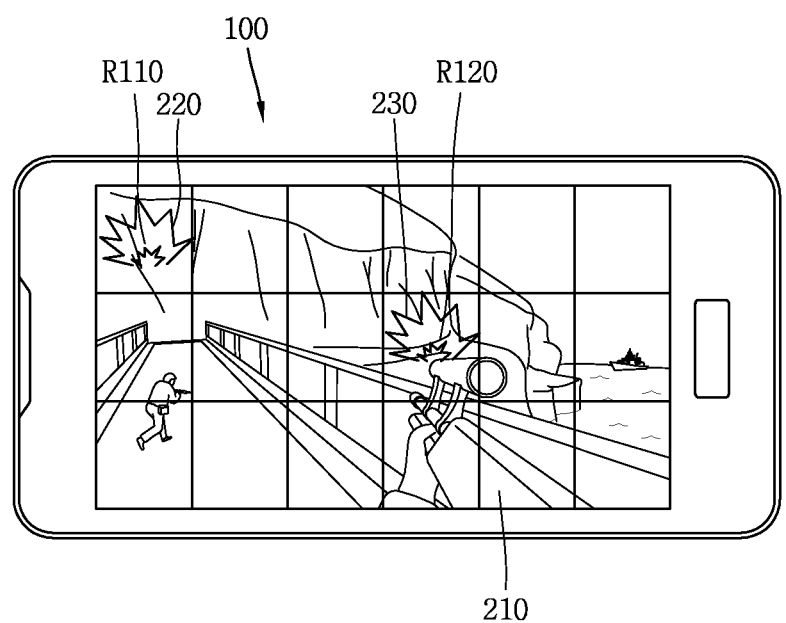
FIG. 4 is an exemplary view showing a method for deciding a vibration output parameter in accordance with a first exemplary embodiment.

FIG. 4 is an exemplary view showing a method for determining a vibration output parameter in accordance with a first exemplary embodiment.

As shown in FIG. 4, a screen displayed by the image display apparatus 100 may have a plurality of regions. Among the plurality of regions, FIG. 4 shows a first region R110 including a first point 220 where a first event is generated, and a second region R120 including a second point 230 where a second event is generated.

In accordance with the first exemplary embodiment, the image display apparatus 100 may further include a memory (not shown). The memory may store, in form of a table, vibration output parameters corresponding to the plurality of regions.

When the first and second events are generated on the screen, the controller 110 may determine whether to output vibrations for the first and second events.

When it is determined to output the vibrations for the first and second events, the controller 110 may decide a vibration output parameter corresponding to the first region R110 and the second region R120 with reference to the table stored in the memory.

Hereinafter, description will be given of a method for adjusting an intensity of vibration based on the first distance when the vibration output parameter is an intensity of vibration, with reference to FIGS. 5 and 6.

Second Exemplary Embodiment

In accordance with the second exemplary embodiment, the controller 110 may generate a control signal to allow for outputting a vibration corresponding to each event to the outside of the image display apparatus 100.

As aforementioned, the control signal generated by the controller 110 is transferred to the driving unit 140, and the driving unit 140 may drive the exciter 120 to generate vibration based on the transferred control signal.

Here, for outputting the vibration corresponding to each event, the controller 110 may decide (select) an intensity of vibration of the a vibration output parameters.

Hereinafter, description will be given of a method for deciding an intensity of vibration in accordance with a second exemplary embodiment. Also, as one example, description will be given of a process of outputting a 3D space on a screen displayed and deciding an intensity of vibration for each event when at least one event is generated on the 3D space.

First, when at least one event is detected on the 3D space, the controller 110 may calculate a first distance between a point where the event has been generated on the 3D space and a first object present on the 3D space.

Also, the controller 110 may use a second distance which is a reference distance for normalization of the first distance. The second distance may correspond to a maximum distance expected between two random points on the screen, or a distance to the farthest point from the first object on the screen. For example, if the screen has a square area of 20 cm×20 cm, the second distance is a maximum distance expected between two random points on the screen, and may be 20√2 cm as a diagonal length of the square. In addition, it will be obvious to a person skilled in the art that the second distance can be decided by various references so as to normalize the first distance. Hereinafter, description will be given of a case where the second distance is a distance to the farthest point from the first object on the screen.

As aforementioned, the controller 110 may calculate the second distance which is the distance to the farthest point from the first object on the screen.

The controller 110 may decide an intensity of vibration corresponding to each event based on a ratio of the first distance and the second distance and generate a control signal for controlling a vibration with the decided intensity to be generated.

Figure 5:
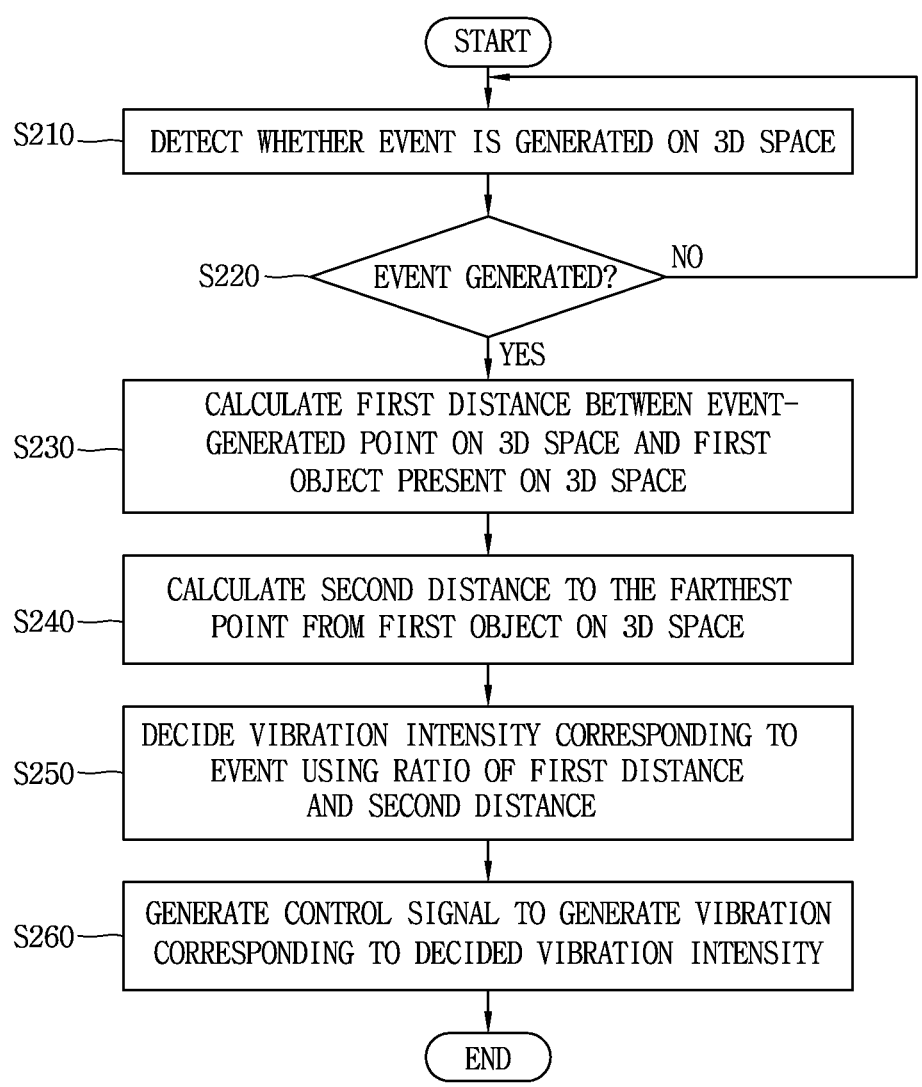
FIG. 5 is a flowchart showing a method for adjusting an intensity of vibration for implementing a vibration with a sense of realism in accordance with a second exemplary embodiment.

FIG. 5 is a flowchart showing a method for adjusting an intensity of vibration for implementing a vibration with a sense of realism in accordance with a second exemplary embodiment.

As shown in FIG. 5, a method for adjusting an intensity of vibration according to the second exemplary embodiment may include the following steps.

First, the image display apparatus 100 may detect whether or not an event is generated in a 3D space, which is output by the image display apparatus 100 (S210).

The image display apparatus 100 may determine whether at least one event has been generated in the 3D space through the detection (S220), and if generated, calculate a first distance, which is a distance between a point where the event has been generated on the 3D space, and a first object present on the 3D space (S230). Also, if any event has not been generated, the image display device 100 may continue to detect whether an event is generated in the 3D space.

The image display apparatus 100 may then calculate a second distance, which is a distance to the farthest point from the first object on the 3D space (S240).

The image display apparatus 100 may decide an intensity of vibration corresponding to the event using a ratio of the first distance and the second distance (S250).

The image display apparatus 100 may generate a control signal to generate a vibration corresponding to the decided intensity (S260).

The first object may be various types of things, materials or persons present on the 3D space. For example, the first object may be a user object substituted on the 3D space. Hence, the first distance may be a distance between the point where the event has been generated and the point where the user object is located. The intensity of vibration may be calculated based on the distance between the event-generated point and the user object-located point. Accordingly, the user of the image display apparatus 100 can more feel the sense of realism or an realistic sense from the event generated on the 3D space.

The intensity of vibration may indicate a intensity of the vibration generated by the exciter 120. The intensity of vibration may be defined by a frequency or amplitude of a vibration generated. For example, if it is assumed that a frequency of a generated vibration is 100 kHz when the first distance is 10 m, a frequency of a generated vibration may be 10 kHz when the first distance is 100 m, accordingly, the intensity of the generated vibration can be lowered. The method for adjusting the intensity of vibration will be described later with reference to FIG. 6.

The decision of the intensity of vibration may be made by using a ratio of the first distance and the second distance.

The ratio of the first distance and the second distance may be calculated by various ways. For example, the ratio of the first distance and the second distance may be represented with a fractional number having the first distance as a numerator and the second distance as a denominator.

However, the ratio of the first distance and the second distance is merely means for deciding the intensity of vibration based on the distance between the event-generated point and the first object, so various calculating methods using the distance between the event-generated point and the first object can be employed for the decision of the intensity of vibration. As one example, the second distance may be used as a scaling factor for scaling of the first distance. For example, if it is assumed that an intensity of vibration is decided by multiplying the first distance by 0.1 when the second distance is 100, an intensity of vibration may be decided by multiplying the first distance by 1 when the second distance is 1000.

The above method can be applied to decide an intensity of vibration because the representation of a relative intensity of vibration based on a distance may be more important to increase the sense of realism or the realistic sense than an absolute intensity of vibration based on a distance, in view of applying the distance between the event-generated point and the first object to the intensity of vibration.

Hereinafter, description will be given in detail of calculation of the first distance, calculation of the second distance and decision of the intensity of vibration using the ratio of the first distance and the second distance, with reference to FIGS. 6 to 8.

Third Exemplary Embodiment

Figure 6:
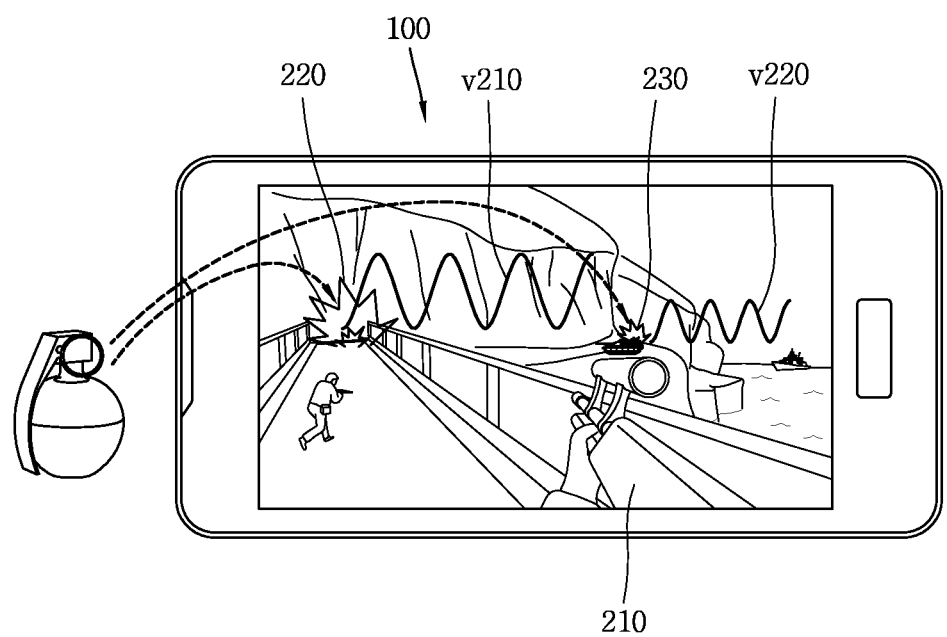
FIG. 6 is an exemplary view showing an image display apparatus for outputting a vibration with a sense of realism in accordance with a third exemplary embodiment.

FIG. 6 is an exemplary view showing an image display apparatus for outputting a vibration with a sense of realism in accordance with a third exemplary embodiment.

As shown in FIG. 6, for a 3D firing emulation game, a first object 210, which is a user object in a shape of a gun, is substituted on the 3D space output from the image display apparatus 100, and an explosion of a grenade thrown, which is an event generated in the 3D firing emulation game, is occurring respectively at a first point 220 and a second point 230.

In accordance with a third exemplary embodiment, the image display apparatus 100 may decide intensity of a vibration based on the event-generated point and the user object for output of a realistic vibration effect. In FIG. 6, since the distance between the first point 220 and the first object 210 is shorter than the distance between the second point 230 and the first object 210, the impact of the explosion of the thrown grenade in a real situation may be stronger at the first point 220. Therefore, the image display apparatus 100 may set or decide the intensity of the vibration v210 generated by the explosion at the first point 220 to be stronger than the intensity of the vibration generated by the explosion at the second point 230, thereby implementing the realistic vibration effect.

Figure 7:
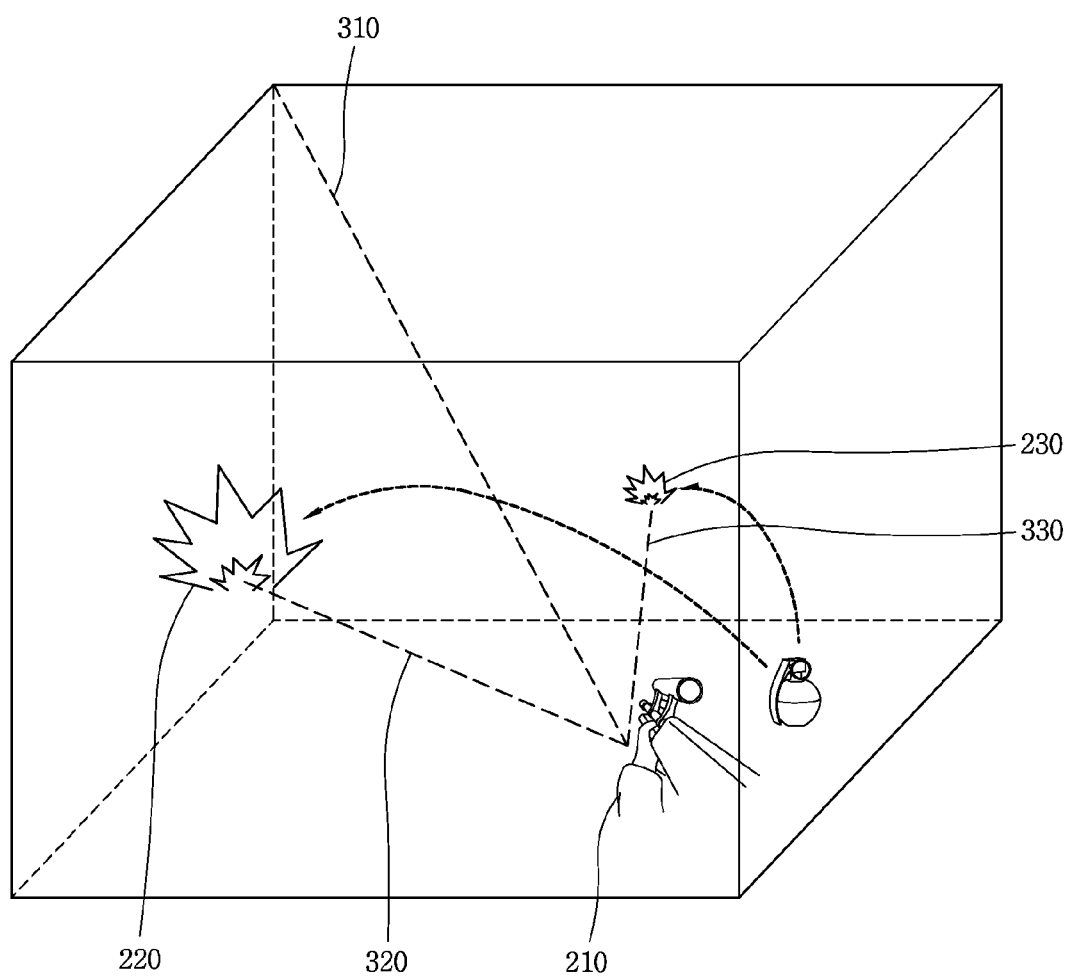
FIG. 7 is an exemplary view showing a method for deciding an intensity of vibration in the aspect of outputting the vibration with the sense of realism in accordance with the third exemplary embodiment.

FIG. 7 is an exemplary view showing a method for deciding an intensity of vibration in the aspect of outputting the vibration with the sense of realism in accordance with the third exemplary embodiment.

As shown in FIG. 7, the first distance 320, which is a distance between the first point 220 and the first object 210, may be obtained by calculating a geometrical distance. For example, if coordinates of the first point 220 are (a, b) and coordinates of the first object 210 are (x, y) on the 3D space, the first distance 320 may be calculated as follows (here, 2D coordinates were used for convenience of calculation).

$$\sqrt{(a-x)^2+(b-y)^2} \quad \text{[Formula 1]}$$

The image display apparatus 100 may then calculate the second distance 310, which is the farthest distance from the first object 210 on the 3D space, for normalization of the first distance 320. For example, when the coordinates of the farthest point from the first object 210 are (1, 1) on the 3D space, the second distance 310 may be calculated as follows.

$$\sqrt{(1-x)^2+(1-y)^2} \quad \text{[Formula 2]}$$

The normalization of the first distance 320 using the second distance 310 may be realized by calculating the ratio of the first distance and the second distance. For example, if the first distance 320 is 10 and the second distance 310 is 100, the normalized first distance may be 10/100=0.1.

The intensity of a vibration in accordance with the first exemplary embodiment may be calculated by multiplying the normalized first distance by a maximum intensity of vibration, which the image display apparatus 100 is able to output.

As aforementioned, the intensity of the vibration output by the image display apparatus 100 may be adjusted by a frequency of vibration, an amplitude of vibration or the combination of the amplitude and frequency of vibration. Hence, a unit of the maximum intensity of vibration which the image display apparatus 100 is able to output may be a unit that the frequency of vibration or the amplitude of vibration has.

When the intensity of vibration is adjusted by a frequency, the intensity of vibration at the first point according to the first exemplary embodiment may be calculated as follows.

$$\left(1 - \frac{\text{first distance}}{\text{second distance}}\right) \times \text{MAX\_FREQ} \quad \text{[Formula 3]}$$

The MAX_FREQ denotes a maximum frequency that a vibration output of the image display apparatus can have.

Also, when the intensity of vibration is adjusted by an amplitude of the vibration, the intensity of vibration according to the first exemplary embodiment may be calculated as follows.

$$\left(1 - \frac{\text{first distance}}{\text{second distance}}\right) \times \text{MAX\_AMP} \quad \text{[Formula 4]}$$

The MAX_AMP denotes a maximum amplitude that a vibration output of the image display apparatus 100 can have.

The image display apparatus 100 can calculate the intensity of vibration caused due to the event (i.e., the explosion of the grenade thrown) generated at the second point 230. Similar to the aforementioned method, a third distance 330, which is a distance between the second point 230 and the first object 210, may be obtained by calculating a geometrical distance. For example, if coordinates of the second point 230 are (c, d) and coordinates of the first object 210 are (x, y) on the 3D space, the third distance 330 may be calculated as follows.

$$\sqrt{(c-x)^2+(d-y)^2} \quad \text{[Formula 5]}$$

Hence, the intensity of vibration at the second point in accordance with the first exemplary embodiment may be calculated as follows.

$$\left(1 - \frac{\text{third distance}}{\text{second distance}}\right) \times \text{MAX\_FREQ} \quad \text{[Formula 6]}$$

-continued $$\left(1 - \frac{\text{third distance}}{\text{second distance}}\right) \times \text{MAX\_AMP}$$

The MAX_FREQ denotes a maximum frequency that a vibration output of the image display apparatus can have, and the MAX_AMP denotes a maximum amplitude that a vibration output of the image display apparatus 100 can have.

When the coordinates of the first object 210 as the user object positioned on the 3D space are eventually obtained, the second distance 310 is fixed. Hence, the second distance 310 may be used for the purpose of normalization of those distances between the points of a plurality of events, which may be generated on the 3D space, and the first object 210, in order to compare those distances.

Through the normalization, the vibrations output in response to the plurality of events can have different intensities based upon each normalized distance corresponding to the plurality of events.

For example, when the first distance 320 is 10, the second distance 310 is 1000, the third distance 330 is 100 and MAX-FREQ is 100 Hz, the intensity of the vibration output in response to the event generated at the first point 220 may be (1−10/1000)*100=99, and the intensity of the vibration output in response to the event generated at the second point 230 may be (1−100/1000)*100=90. Consequently, the intensity of the vibration at the first point 220, which is located closer to the first object 210, may be stronger than the intensity of the vibration at the second point 230, accordingly, the image display apparatus 100 can output a realistic vibration with the sense of realism.

FIG. 8 is an exemplary view showing a method for adjusting the intensity of vibration in accordance with the third exemplary embodiment.

As aforementioned, the intensity of the vibration output in response to an event which may be generated on the 3D space may be adjusted by the frequency of vibration, the amplitude of vibration or the combination of the frequency and amplitude of vibration.

As shown in FIG. 8, FIG. 8(a) shows a vibration output in response to an event generated at the second point 230. As previously described, since the second point 230 is farther away from the first object 210 than the first point 220, the intensity of the vibration at the second point 230 may be calculated to be lower than the intensity of the vibration at the first point 220.

Hence, the intensity of the vibration at the first point 220 should be adjusted to be higher than the intensity of the vibration based on the second point 230.

FIG. 8(b) shows a case where the intensity of the vibration at the first point 220 is increased by adjusting the frequency of the vibration. In this case, since the frequency of the vibration at the first point 220 is greater than the frequency of the vibration at the second point 230, the vibration output at the first point 220 can be felt stronger by the user of the image display apparatus 100 than the vibration output at the second point 230.

FIG. 8(c) shows a case where the intensity of the vibration at the first point 220 is increased by adjusting the amplitude of the vibration. In this case, since the amplitude of the vibration at the first point 220 is greater than the amplitude of the vibration at the second point 230, the vibration output at the first point 220 can be felt stronger by the user of the image display apparatus 100 than the vibration output at the second point 230.

As one exemplary variation, the intensity of the vibration at the first point 220 may be increased by adjusting both the frequency and the amplitude of the vibration. Even in this case, since the frequency and the amplitude of the vibration at the first point 220 are greater than the frequency and the amplitude of the vibration at the second point 230, the vibration output at the first point 220 can be felt stronger by the user of the image display apparatus 100 than the vibration output at the second point 230.

Also, as another exemplary variation, the method for adjusting the intensity of vibration may depend on a type of event which is generated on the 3D space. For example, when the event is an explosion of a grenade thrown, the intensity of vibration may be increased or decreased by adjusting the amplitude of the vibration. When the event is an impact due to firing, the intensity of vibration may be increased or decreased by adjusting the frequency of the vibration.

Hereinafter, description will be given of various output forms of vibrations due to events generated on the 3D space, with reference to FIG. 9.

Fourth Exemplary Embodiment

FIG. 9 is an exemplary embodiment showing various output forms of vibrations which may be generated in an image display apparatus in accordance with a fourth exemplary embodiment.

As aforementioned, the output parameter may be at least one of an intensity of vibration, a time duration of vibration, a start time of vibration, an attenuation ratio of vibration according to a time and the like. Among those output parameters, the time duration of vibration, the start time of vibration and the attenuation ratio of vibration according to the time may correspond to the output forms of the vibration.

According to the fourth exemplary embodiment, the realistic vibration generated by the image display apparatus 100 may be better implemented by adjusting output forms of vibrations responsive to events generated on the 3D space in various manners.

Referring to FIG. 9, FIG. 9(a) shows a reference vibration waveform compared with vibration waveforms having various output forms to be explained later. The reference vibration waveform may indicate a waveform of vibration output in response to an event generated at a random point on a 3D space, which is output by the image display apparatus 100. Hereinafter, the random point is referred to as a reference point.

In accordance with the fourth exemplary embodiment, among those output parameters, in the relation between the intensity of vibration and the time duration of vibration, the time duration of vibration may be inversely proportional to the intensity of vibration.

In detail, an event may be generated at a point different from the reference point. Also, when an effect, which is caused by the event generated at the different point in a virtual reality, is continuously maintained longer than an effect of an event generated at the reference point, the image display apparatus 100 may set the output time of the vibration responsive to the event at the different point to be longer than an output time of the vibration based on the reference point.

For example, when an exposition is occurring due to a small bomb at the reference point and an explosion is occurring due to a great bomb at the different point, the continuity of the explosion due to the great bomb may be greater than that related to the small bomb, so the image display apparatus 100 may set the output time of the corresponding vibration for the explosion due to the great bomb to be longer than the output time of the vibration for the small bomb.

FIG. 9(b) shows a waveform of a vibration generated at the different point in case where the effect of the event at the different point is continued longer than at the reference point. As shown in FIG. 9(b), it can be noticed that the output time of the vibration at the different point is longer than in the case shown in FIG. 9(a).

In accordance with the fourth exemplary embodiment, among those output parameters, in the relation between the intensity of vibration and the start time of vibration, the start time of vibration may be proportional to the intensity of vibration.

In detail, the different point may be a point farther away from a user object than the reference point. When an explosion due to an explosive is occurring at the point farther away from the user object, it may be general that an impact due to the explosion is transferred with delay to the user object.

Here, the image display apparatus 100 may implement the realistic vibration more effectively by delaying an output time point of the vibration responsive to the event generated at the different point.

FIG. 9(c) shows a waveform of a vibration responsive to an event, which is generated at a point farther away from the user object than the reference point. As shown in FIG. 9(c), it can be noticed that an output time point of the vibration responsive to the event generated at the different point is started later than in the case of FIG. 9(a).

Also, when an explosion due to an explosive is happened in a real situation, the impact due to the explosion may be prone to decrease as a time elapses. Hence, the image display apparatus 100 may decrease the intensity of the vibration responsive to the event generated on the 3D space according to the time.

FIG. 9(d) shows a waveform indicating that the intensity of a vibration output responsive to an event generated on the 3D space is decreased as a time goes.

Fifth Exemplary Embodiment

Figure 10:
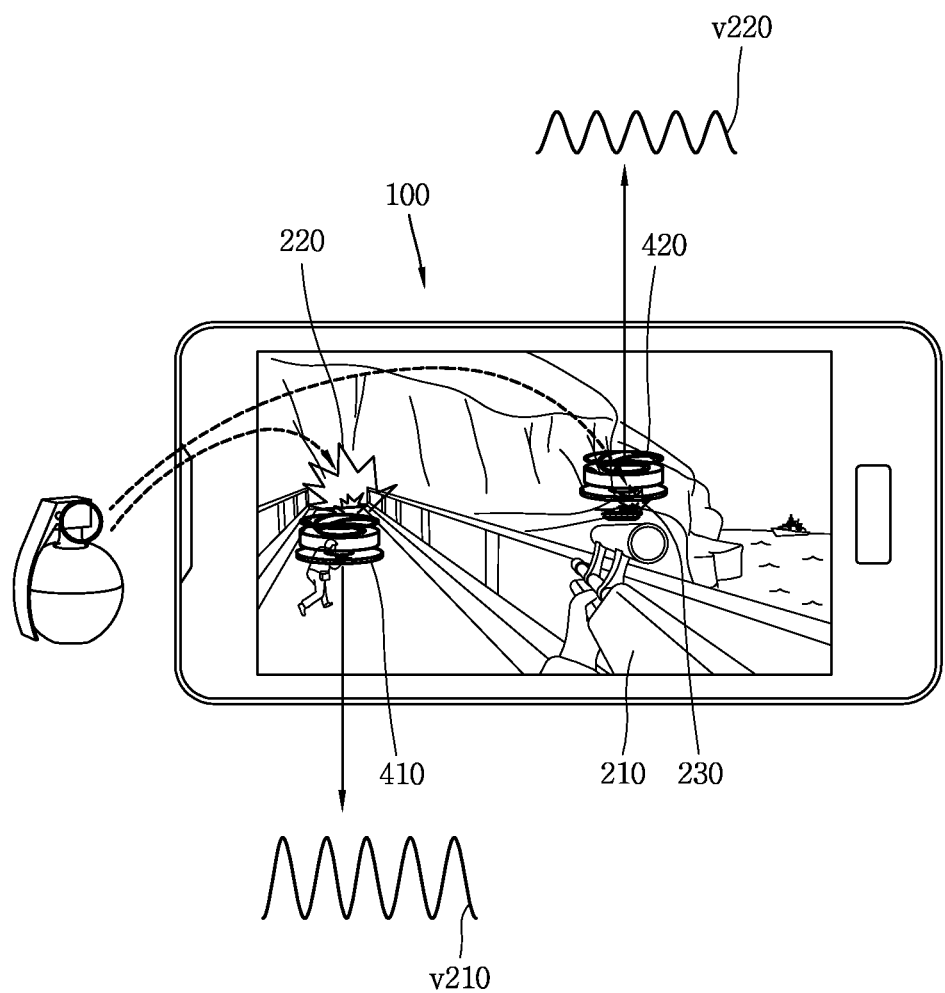
FIG. 10 is an exemplary view showing a vibration output method for implementing a vibration with a sense of realism in accordance with a fifth exemplary embodiment.

FIG. 10 is an exemplary embodiment showing a vibration output method for implementing a vibration with a sense of realism in accordance with a fifth exemplary embodiment.

In accordance with the fifth exemplary embodiment, the exciter 120 may include one or more vibration generators. The screen may be divided into a plurality of regions. The controller 110 may control the vibration generators, which are arranged at corresponding areas, to which the respective events belong, among the plurality of areas of the screen, to generate vibrations.

More concretely, the image display apparatus 100 may control a vibration with the decided intensity to be generated at a position on the 3D space, corresponding to the point where the event has been generated.

Here, since the user of the image display apparatus 100 can feel the vibration from the position of the image display apparatus 100 corresponding to the point where the event has been generated, the user may be able to more strongly feel the sense of realism or the realistic sense.

Referring to FIG. 10, the event, such as the explosion of the grenade thrown, may be generated at the first point 220 or the second point 230 on the 3D space. Also, the image display apparatus 100 may be provided with a first vibrator 410 at a position corresponding to the first point 220, and a second vibrator 420 at a position corresponding to the second point 230. Here, the first vibrator 410 may indicate a vibrator located close to the first point 220 or a vibrator set to correspond to the first point 220. Also, the second vibrator 420 may indicate a vibrator located close to the second point 230 or set to correspond to the second point 230.

In this case, the image display apparatus 100 may generate a vibration v210 responsive to a first event generated at the first point 220 through the first vibrator 410, and a vibration v220 responsive to a second event generated at the second point 230 through the second vibrator 420.

In accordance with the fifth exemplary embodiment, the image display apparatus 100 may individually control the first vibrator 410 and the second vibrator 420 according to types or properties of the first and second events, a distance from the first object 210 (user object) and the like.

Under the individual control of the image display apparatus 100 with respect to the first vibrator 410 and the second vibrator 420, the intensities of the vibrations responsive to the first event and the second event may be controlled individually.

For example, when a first distance as a distance between the first point 220 and the first object 210 is shorter than a second distance as a distance between the second point 230 and the first object 210, the image display apparatus 100 may increase an output of a vibration motor corresponding to the first vibrator 410 so as to increase the intensity of the vibration at the first point 220. On the contrary, the image display apparatus 100 may decrease an output of a vibration motor corresponding to the second vibrator 420 so as to reduce the intensity of the vibration at the second point 230.

In accordance with the fifth exemplary embodiment, when the image display apparatus 100 has a plurality of vibrators, which are different from each other and located at individual positions, each vibration generated by the plurality of vibrators can be combined to be transferred to the user of the image display apparatus 100. Eventually, the image display apparatus 100 can naturally implement a superposition effect for vibrations due to a plurality of events happened on the 3D space. Consequently, the user of the image display apparatus 100 can more strongly feel the vibrations with the sense of realism.

Hereinafter, description will be given of a method for changing a screen of the image display apparatus 100 involved with a realistic vibration, with reference to FIG. 11.

Sixth Exemplary Embodiment

Figure 11:
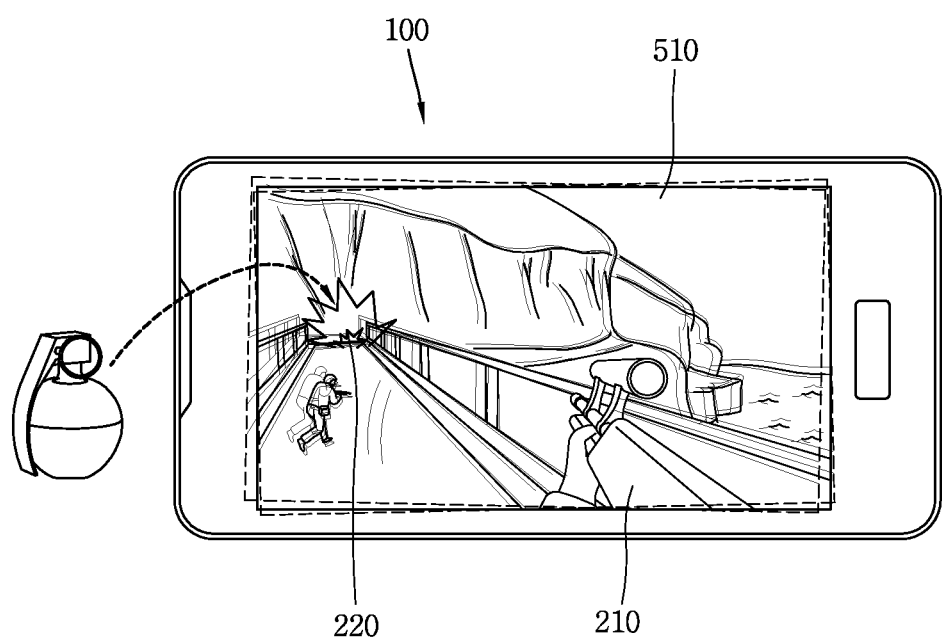
FIG. 11 is an exemplary view showing a method for changing a screen of an image display apparatus in association with a vibration with a sense of realism in accordance with a sixth exemplary embodiment.

FIG. 11 is an exemplary view showing a method for changing a screen of an image display apparatus involved with a vibration with a sense of realism in accordance with a sixth exemplary embodiment.

According to the sixth exemplary embodiment, the image display apparatus 100 may further include a display unit to output a screen. The controller 110 may control the display unit to output a screen based on an output vibration when the vibration is output.

Also, the displayed screen output based on the output vibration appear to the user that the screen view is shaking or vibrating.

In detail, the image display apparatus 100 may implement the vibration with the sense of realism and simultaneously change the screen in association with the vibration with the sense of realism. Consequently, the user of the image display apparatus 100 can experience a virtual reality with the stronger sense of realism or realistic sense.

The screen change by the image display apparatus 100 may be realized by various ways. For example, the screen change may be realized by changing at least one of color, size and shape of the screen with outputting the realistic vibration. Alternatively, the screen change may be realized by trembling the screen in a specific direction with outputting the realistic vibration.

In accordance with the sixth exemplary embodiment, the image display apparatus 100 may change a 3D screen output therefrom based on an intensity of vibration, which is calculated based on an event generated on the 3D space. Also, changing the 3D screen output from the image display apparatus 100 may be to tremble the 3D screen with a predetermined frequency of vibration in a specific direction. The predetermined frequency of vibration may be decided based on the calculated intensity of vibration.

Accordingly, the user of the image display apparatus 100 can experience a virtual reality seeming to be more real through the screen change synchronized with the realistic vibration.

Referring to FIG. 11, when a first event such as an explosion of a grenade thrown has been generated at the first point 220, the image display apparatus 100 may control an intensity of a vibration responsive to the first event by changing a frequency of the vibration. Also, the image display apparatus 100 may make a 3D screen 510 trembled in a specific direction while outputting the vibration with the adjusted frequency. FIG. 11 shows a case where the specific direction is a perpendicular direction.

As one exemplary variation, the image display apparatus 100 may control the 3D screen 510 such that the 3D screen 510 can be trembled in a specific direction with colors periodically changed. For example, the image display apparatus 100 may periodically change a background color of the 3D screen 510 into a red-based color, which alerts danger, as the 3D screen 510 is trembled.

Seventh Exemplary Embodiment

Figure 12:
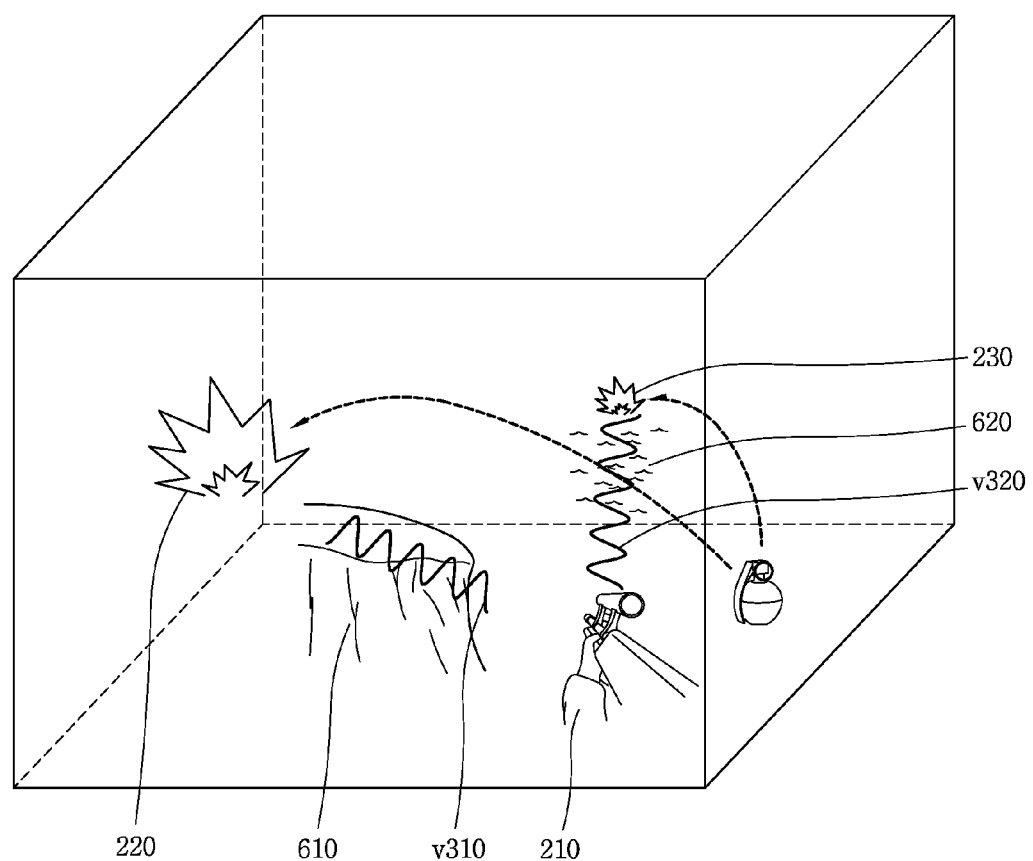
FIG. 12 is an exemplary view showing a vibration output method for implementing a vibration with a sense of realism in accordance with a seventh exemplary embodiment.

FIG. 12 is an exemplary view showing a vibration output method for implementing a vibration with a sense of realism in accordance with a seventh exemplary embodiment.

In accordance with the seventh exemplary embodiment, the controller 110 may decide a vibration output parameter for each event based on a position of each event and a characteristic of a graphic object on a screen.

Also, the characteristic of the graphic object may be at least one of size, shape, specific gravity and impact absorption ratio of the graphic object.

In detail, the image display apparatus 100 may calculate a first distance 320, which is a distance between a first point 220 where an event is generated on the 3D screen and a first object 210 as a user object. Also, the image display apparatus 100 may calculate a second distance 310, which is the farthest distance from the first object 210, and calculate an intensity of a vibration output at the first point 220 based on a ratio of the first distance and the second distance.

According to the seventh exemplary embodiment, the image display apparatus 100 may change the intensity of the vibration based on a material present on the 3D space within the first distance 320, so as to output a realistic vibration in consideration of type, property or size of the material present on the 3D space.

Referring to FIG. 12, a first event due to a grenade thrown may be generated at the first point 220, and a second event due to another grenade thrown may be generated at the second point 230.

Here, the image display apparatus 100 may calculate the first distance 320 between the first point 220 and the first object 210, the second distance 310 as the farthest distance from the first object 220, and a third distance 330 between the second point 310 and the first object 210.

The image display apparatus 100 may calculate a first intensity of vibration v310 and a second intensity of vibration v320 of vibrations output in response to the first event and the second event using the calculated first distance 320, second distance 310 and third distance 330.

According to the seventh exemplary embodiment, the image display apparatus 100 may change the calculated first intensity of vibration and second intensity of vibration based on the materials which are present within the first distance 320 and the second distance 310. Changing the first and second vibration intensities based on the materials may indicate changing the first and second vibration intensities in consideration of at least one of type, property, size and shape of the materials. For example, the intensity of the vibration may more increase when the size of the material is 100 m$^3$ than when the size of the material is 10 m$^3$.

FIG. 12 shows that a first material 610 present within the first distance 320 is a rock and a second material 620 present within the second distance 330 is water.

In this case, the first material 610 and the second material 620 may exhibit different impact absorption ratio with respect to the explosion. Hence, the image display apparatus 100 may change the first and second intensities of the vibrations based on the difference in the adsorptions. For example, the rock which is the first material 610 may exhibit 20% impact absorption ratio and the water which is the second material 620 may exhibit 40% impact absorption ratio. Here, the image display apparatus 100 may change the first and second intensities by multiplying the first intensity of vibration by 0.8 and the second intensity of vibration by 0.6.

Figure 13:
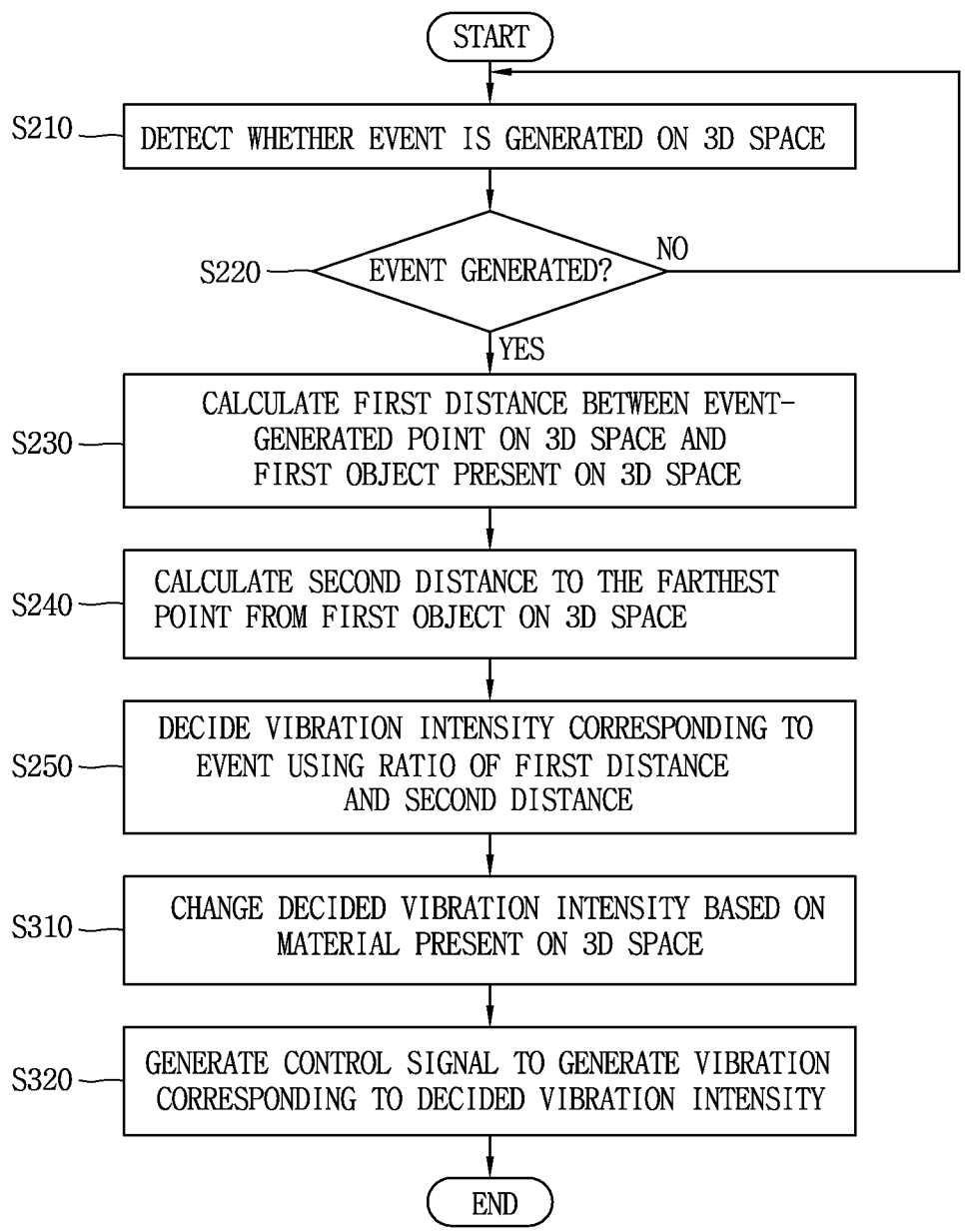
FIG. 13 is a flowchart showing the vibration output method for implementing the vibration with the sense of realism in accordance with the seventh exemplary embodiment.

FIG. 13 is a flowchart showing the vibration output method for implementing the vibration with the sense of realism in accordance with the seventh exemplary embodiment.

As shown in FIG. 13, the vibration output method for implementing the realistic vibration in accordance with the seventh exemplary embodiment may include the following steps.

First, the image display apparatus 100 may detect whether an event is generated on a 3D space output by the image display apparatus 100 (S210).

The image display apparatus 100 may determine whether an event has been generated in the 3D space through the detection (S220), and if generated, calculate a first distance, which is a distance between a point where the event has been generated on the 3D space, and a first object present on the 3D space (S230). Also, if any event has not been generated, the image display device 100 may continue to detect whether an event is generated on the 3D space.

The image display apparatus 100 may then calculate a second distance, which is the farthest distance from the first object on the 3D space (S240).

The image display apparatus 100 may decide an intensity of a vibration corresponding to the event using a ratio of the first distance and the second distance (S250).

The image display apparatus 100 may change the decided intensity of the vibration based on a material present on the 3D space (S310).

The image display apparatus 100 may generate a control signal to generate a vibration corresponding to the changed intensity (S320).

Hereinafter, description will be given of a method for implementing a vibration with the sense of realism using a superposition principle, with reference to FIG. 14.

Eighth Exemplary Embodiment

FIG. 14 is an exemplary view showing a method for implementing a vibration with a sense of realism using a superposition principle in accordance with an eighth exemplary embodiment.

In accordance with the eighth exemplary embodiment, in regard of setting an intensity of vibration of the vibration output parameters, when vibrations should be output for a plurality of events generated on the screen vibrations, the controller 110 may calculate the sum of intensities of the respective vibrations corresponding to the plurality of events. The calculation of the intensity of the vibration based on the sum of intensities of vibrations corresponding to the plurality of events may be typically based on a superposition principle.

That is, a plurality of events may be generated on the 3D space. The image display apparatus 100 may calculate the intensity of the vibration by adding the intensities of the vibrations corresponding to the plurality of events generated on the 3D space.

According to the method, the image display apparatus 100 may implement a realistic vibration using the superposition principle even though a single vibrator is employed, unlike the fifth exemplary embodiment.

Referring to FIG. 14, the image display apparatus 100 may calculate the first intensity of the vibration corresponding to the first event generated at the first point 220. The first intensity may be an intensity of vibration that the vibration waveform shown in FIG. 14(*a*) has. Also, the image display apparatus 100 may calculate the second intensity of the vibration corresponding to the second event generated at the second point 230. The second intensity may be an intensity of vibration that the vibration waveform shown in FIG. 14(*b*) has.

In this case, in order to provide a realistic vibration effect using the superposition principle to the first object 210 as the user object, the image display apparatus may calculate the total intensity by adding the first intensity of vibration and the second intensity of vibration. For example, in case where an intensity of vibration is implemented based on an amplitude of vibration, if a frequency and a phase of a vibration based on the first point are the same as those of a vibration based on the second point, when the amplitude of the vibration based on the first point is 100 and the amplitude of the vibration based on the second point is 150, the image display apparatus 100 may obtain 250 as the calculated value of the amplitude of the vibration to be output. The superposition principle may be equally applied to the adjustment based on the frequency of vibration.

FIG. 14(*c*) shows a waveform of a vibration output by the method for implementing the realistic vibration using the superposition principle. The vibration waveform shown in FIG. 14(*c*) is obtained as the vibration waveforms shown in FIGS. 14A and 14B are superposed. Since frequency and phase of the vibration waveform of FIG. 14(*a*) are the same as those of FIG. 14(*b*), there is no distortion of the waveform of FIG. 14(*c*). However, when the frequency and the phase of the waveform of FIG. 14(*a*) are different from those of FIG. 14(*b*), the vibration waveform of FIG. 14(*c*) may be distorted partially or entirely due to the superposition principle.

Ninth Exemplary Embodiment

Figure 15:
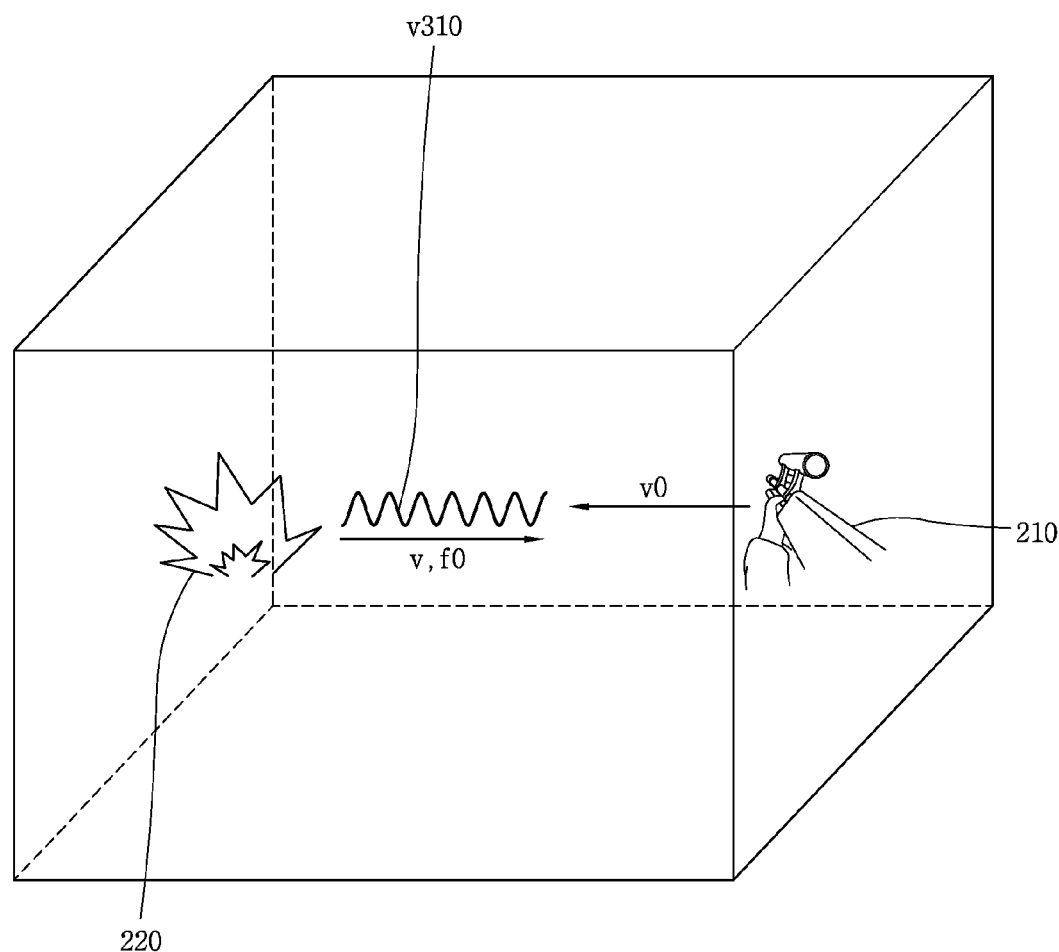
FIG. 15 is an exemplary view showing a vibration output method for implementing a vibration with a sense of realism in accordance with a ninth exemplary embodiment.

FIG. 15 is an exemplary view showing a vibration output method for implementing a sensory vibration in accordance with a ninth exemplary embodiment.

In accordance with the ninth exemplary embodiment, the image display apparatus 100, as aforementioned, may calculate the first distance 320 between the first point 220 where the first event has been generated on the 3D space and the first object 210 as the user object. Also, the image display apparatus 100 may calculate the second distance which is the farthest distance from the first object on the 3D space, and then calculate a first intensity of vibration, which is an intensity of a vibration at the first point 320, based on the ratio of the first distance and the second distance.

According to the ninth exemplary embodiment, the image display apparatus 100 may change the calculated first intensity of vibration based on a speed that the first object 210 moves. That is, when adjusting the first intensity of vibration based on a frequency of vibration, the image display apparatus 100 may change the first intensity of vibration by adjusting the frequency of the vibration based on the movement speed of the first object 210.

Accordingly, when the image display apparatus 100 can implement the realistic vibration in consideration of the movement speed of the first object when the first object moves.

Referring to FIG. 15, the first object 210 is moving toward the first point 220 where the event has been generated on the 3D space at speed of v0. Also, a vibration v310 responsive to the event generated at the first point is moving toward the first object 210 at speed of v and a frequency of the vibration v310 is $f_0$.

In this case, the frequency of the vibration v310 felt by the first object becomes faster, so the intensity of the vibration v310 may becomes stronger. In general, this phenomenon is referred to as Doppler effect.

A frequency f' of the vibration v310 at the first point newly changed by the Doppler effect will be calculated as follows.

$$f' = \frac{v + v_0}{v} f_0 \qquad \text{[Formula 7]}$$

where f0 denotes the first intensity of vibration calculated by the image display apparatus 100, and f' denotes a new intensity of vibration which has changed based on the movement speed v0 of the first object 210.

Afterwards, the image display apparatus 100 may generate a control signal for generating a vibration corresponding to the changed new intensity of vibration.

Figure 16:
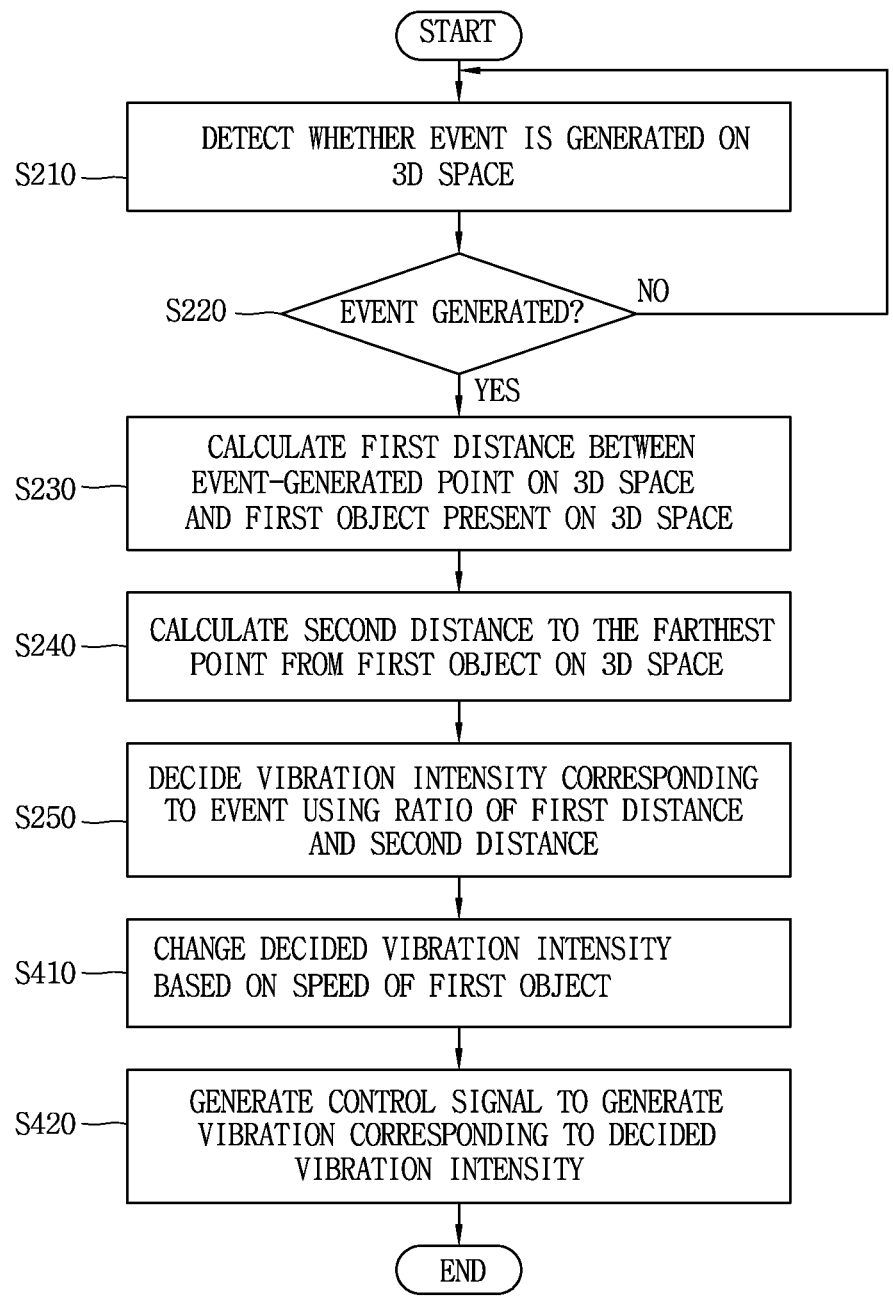
FIG. 16 is a flowchart showing the vibration output method for implementing the vibration with the sense of realism in accordance with the ninth exemplary embodiment.

FIG. 16 is a flowchart showing the vibration output method for implementing the realistic vibration in accordance with the ninth exemplary embodiment.

As shown in FIG. 16, the method for outputting the vibration for implementing the realistic vibration in accordance with the ninth exemplary embodiment may include the following steps.

First, the image display apparatus 100 may detect whether an event is generated on a 3D space output by the image display apparatus 100 (S210).

The image display apparatus 100 may determine whether an event has been generated on the 3D space through the detection (S220), and if generated, calculate a first distance, which is a distance between a point where the event has been generated on the 3D space and a first object present on the 3D space (S230). Also, if any event has not been generated, the image display device 100 may continue to detect whether an event is generated on the 3D space.

The image display apparatus 100 may then calculate a second distance, which is the farthest distance from the first object on the 3D space (S240).

The image display apparatus 100 may decide an intensity of a vibration corresponding to the event using a ratio of the first distance and the second distance (S250).

The image display apparatus 100 may then change the decided intensity of the vibration based on speed of the first object moved (S410).

Afterwards, the image display apparatus 100 may generate a control signal for generation of a vibration corresponding to the changed intensity of vibration (S420).

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 110 of the image display apparatus 100. For software implementation, the embodiments such as procedures and functions may be implemented together with separate software modules each of which performs at least one of functions and operations. The software codes can be implemented with a software application written in any suitable programming language. Also, the software codes may be stored in a memory (not shown) of the image display apparatus 100 and executed by the controller 110.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An image display apparatus, comprising:
a body;
a display unit configured to display a 3D screen corresponding to a 3D space and divided into a plurality of regions;
an exciter having a plurality of vibration generators disposed on the body, each vibration generator overlapped with one of the plurality of regions of the 3D screen and each region of the plurality of regions overlapping with one of the plurality of vibration generators; and
a controller configured to:
   display an event graphic image corresponding to a virtual event in the 3D space, on one region of the plurality of regions of the 3D screen;
   calculate a distance between a user object and a point of the virtual event in the 3D space;
   calculate an intensity of a vibration at the point;

extract at least one material present in the 3D space between the point and the user object;
change the intensity of the vibration at the point based on type, property or size of the material; and
control one vibration generator of the exciter to output vibration based on the changed intensity of the vibration,
wherein the one vibration generator outputting the vibration is overlapped with the one region of the plurality of regions of the 3D screen.

2. The apparatus of claim 1, wherein the controller provides a vibration output parameter including at least one of an intensity of vibration, a time duration of vibration, a start time of vibration and an attenuation ratio of vibration according to a time.

3. The apparatus of claim 2, wherein the intensity of vibration is decided by a frequency of vibration or an amplitude of vibration.

4. The apparatus of claim 3, wherein the controller decides the vibration output parameter for the event graphic image based on a ratio of the first distance and a second distance.

5. The apparatus of claim 4, wherein the second distance is a maximum distance between two random points on the 3D screen or a distance to the farthest point from the first object on the 3D screen.

6. The apparatus of claim 2, wherein the vibration output parameter includes the intensity of vibration and a time duration of vibration, and wherein the time duration of vibration is proportional to the intensity of vibration.

7. The apparatus of claim 2, wherein the vibration output parameter includes the intensity of vibration and a start time of vibration, and wherein the start time of the vibration is inversely proportional to the intensity of vibration.

8. The apparatus of claim 1, wherein the controller controls the 3D screen to change based on the generated vibration.

9. The apparatus of claim 8, wherein the changed 3D screen appears to be shaking or vibrating.

10. The apparatus of claim 1, wherein a characteristic of the graphic image event is at least one of a size, shape, specific gravity and impact absorption ratio of the graphic image event.

11. The apparatus of claim 1, wherein the controller calculates the intensity of the vibration by a sum of intensities of vibrations corresponding to a plurality of events when the vibrations should be output due to generation of the plurality of events on the 3D screen.

12. The apparatus of claim 1, wherein the controller decides the intensity of the vibration for the event graphic image based on a movement speed of a first object present on the 3D screen.

13. A method for controlling an apparatus having a display and an exciter including a plurality of vibration generators, the method comprising:
displaying a 3D screen corresponding to a 3D space on the display, the 3D screen having a plurality of regions;
overlapping each vibration generator of the plurality of vibration generators with one of the plurality of regions of the 3D screen;
overlapping each region of the plurality of regions of the 3D screen with one of the plurality of vibration generators;
displaying an event graphic image corresponding to a virtual event in a 3D space, on one region of the plurality of regions of the 3D screen;
calculating a distance between a user object and a point of the virtual event in the 3D space;
calculating an intensity of a vibration at the point;
extracting at least one material present in the 3D space between the point and the user object;
changing the intensity of the vibration at the point based on type, property or size of the material; and
controlling one vibration generator of the exciter, to output vibration based on the changed intensity of the vibration,
wherein the one vibration generator outputting the vibration is overlapped with the one region of the plurality of regions of the 3D screen.

* * * * *